April 17, 1956  A. BROMS  2,741,945
COPYING CAMERA ASSEMBLY
Filed Nov. 6, 1952  3 Sheets-Sheet 3
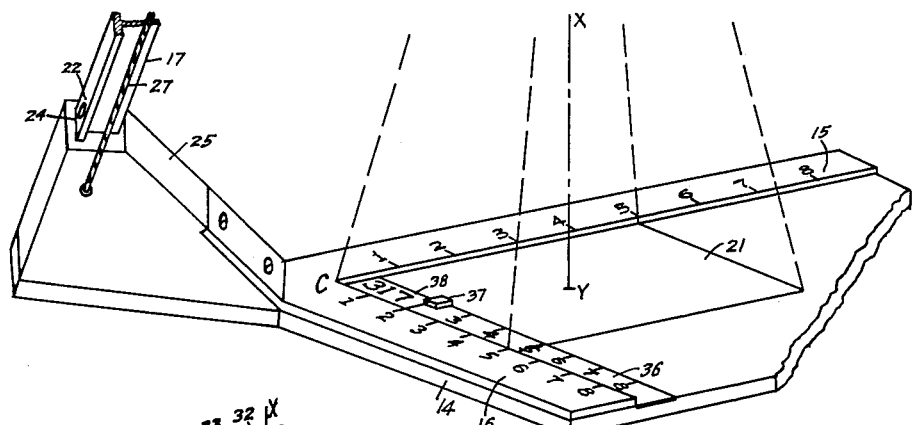
Fig. 5
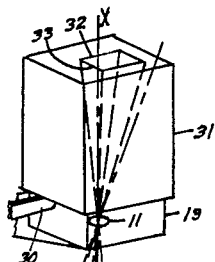
Fig. 4
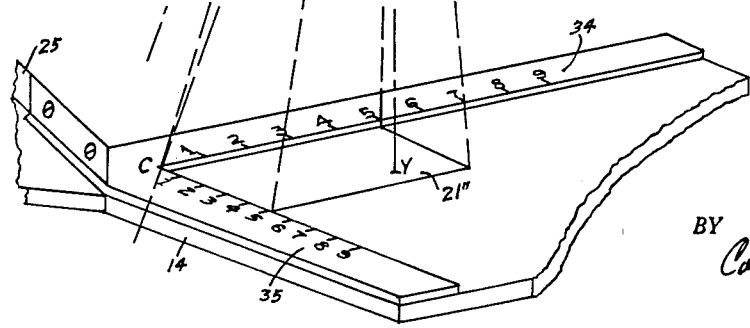
INVENTOR.
Allan Broms
BY Cornelius Zabriskie
Attorney

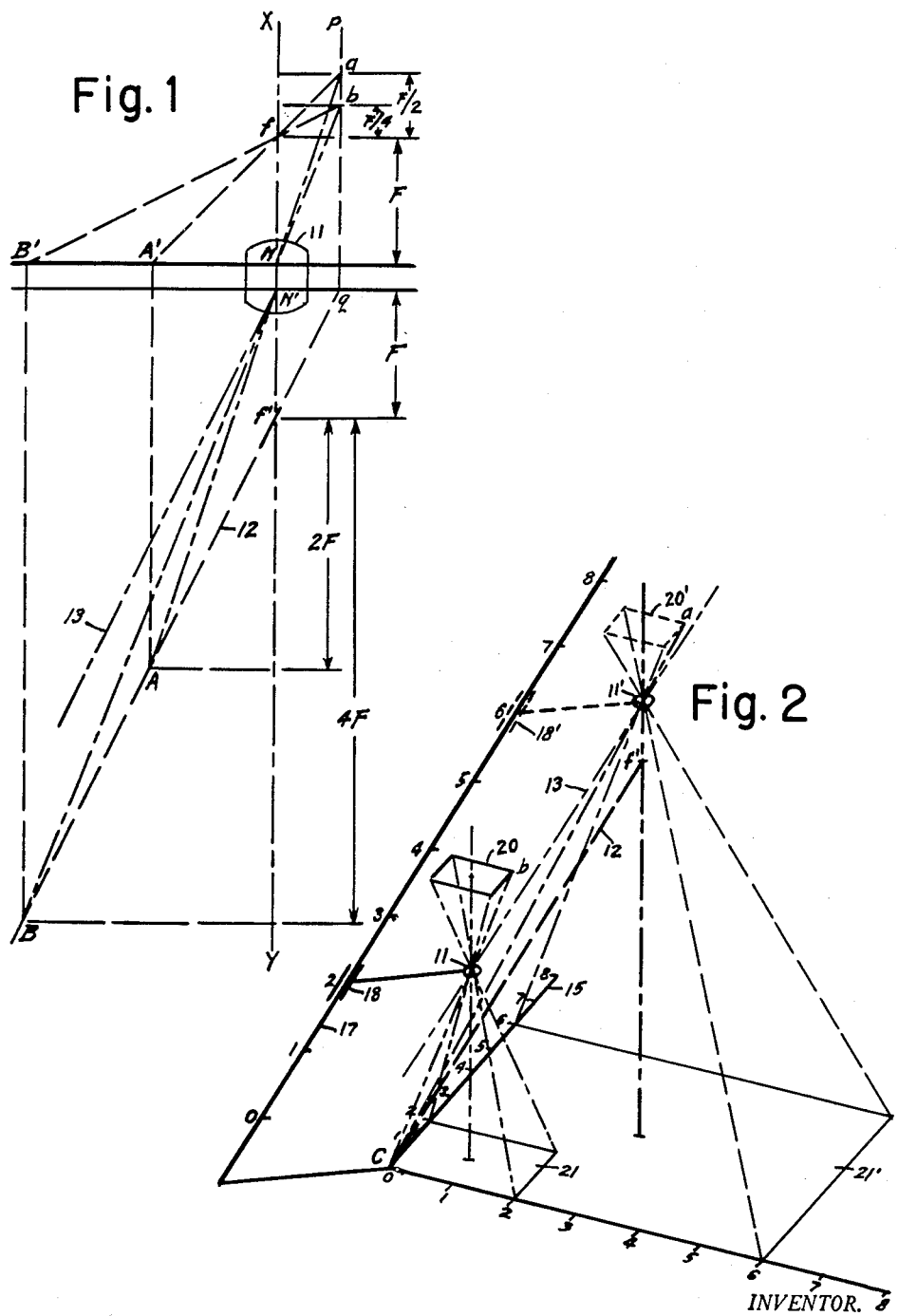

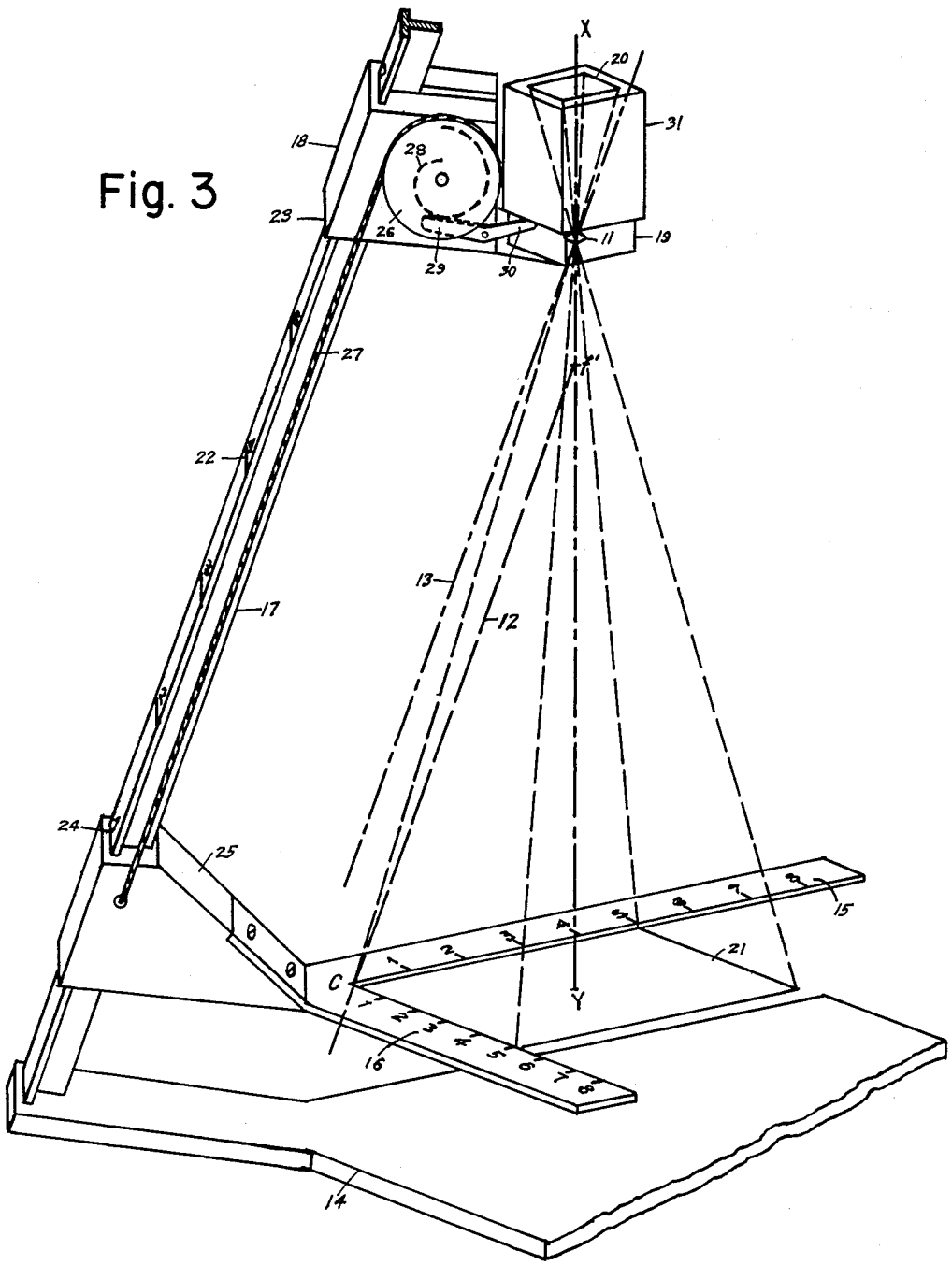

2,741,945

COPYING CAMERA ASSEMBLY

Allan Broms, Beechhurst, N. Y.

Application November 6, 1952, Serial No. 318,990

9 Claims. (Cl. 88—24)

This invention relates to the art of photographic copying of substantially flat originals through the lens of a camera.

The present application is a continuation in part of my prior application Serial No. 165,937, filed June 3, 1950, which was a continuation in part of my prior application Serial No. 606,904, filed July 25, 1945, now abandoned.

In the practical art of copying by camera, it is usual to limit the area being copied by means of an aperture in the interior structure of the camera at and on the lens side of one focal plane, referred to ordinarily and hereinafter as the frame aperture.

This aperture as optically projected through the lens to the focal plane conjugate to the frame aperture plane constitutes the field area covered in the copying, hereinafter referred to as the field area.

Usually the frame aperture and field area planes are maintained normal to the optical axis of the lens, in which case the several edges and corners of the one are projected as edges and corners of the other, and the relative dimensions of the one are proportional to those of the other. Furthermore, the relative sizes of the frame aperture and field area dimensions are proportional to the relative distances of their focal planes from their respective nodal points of the lens, expressed ordinarily and hereinafter as the copying ratio.

To secure sharp definition in copying, the frame and field planes must be kept in mutually conjugate focus at all their relative distances from the lens nodal points and therefore at all copying ratios.

To fit either the dimensions or proportions of originals or copies, or for other purposes, it is often desirable or necessary to alter the dimensions of the frame aperture by masking or like means, thus altering the dimensions or proportions of the conjugately projected field area thereof. It is likewise often desired to record photographically on the copy the copying ratio, or an identification number, label or other data.

While these factors and needs have been long known, there have been no simple, convenient, positive and accurate means whereby the relative positions of the frame aperture, lens and field area can be properly adjusted to get a desired field area position, size or ratio of copying, whereby such relations can be adjusted to said ends when size and/or proportions of the frame aperture have been altered, and whereby the copying ratio, identification numbers, labels or other data can be photographically recorded on the copy.

The primary object of this invention is to provide mechanical means for so doing. The apparatus shown is for purpose of illustration only, and does not define the limits of the invention.

Figure 1 shows a standard graphic diagram for determining conjugate image planes of an optical system.

Figure 2 is a diagrammatic perspective view illustrating graphically the basic method of the present invention.

Figure 3 is a perspective view of the apparatus embodying the present invention.

Figure 4 is a fractional view like Figure 3, but with the frame aperture reduced in size, and the field scales adjusted accordingly.

Figure 5 is a fractional view like Figure 3, but with insetting of the original being copied to uncover a supplementary scale and data within the field area.

More than a century ago one K. F. Gauss formulated the theory of optical image formation illustrated in the standard graphic diagram of Figure 1.

In this diagram the positive lens 11 has the optical axis X—Y, and in said axis the nodal points N and N' and the principal focal points $f$ and $f'$ distant respectively from said nodal points by the lens focal length F. Normal to said axis are nodal planes through N and N'. The image planes hereinafter referred to are likewise normal to the optical axis, each being defined by any single point through which it passes.

By definition, light rays parallel to the optical axis on one side of the lens are refracted by the lens so as to converge to and pass through the principal focal point on the opposite side, and vice versa.

From some point $a$ remote from the optical axis in a given image plane $a$, are drawn two lines representing rays; one $a$—$q$ is parallel to the optical axis X—Y and extends to an intersection with the opposite nodal plane N', while the other $a$—A' extends through the near principal focal point $f$ to an intersection with the near nodal plane N. By ignoring the actual size of the lens opening, these two rays are considered as proceeding, after refraction, respectively through the opposite principal focal point $f'$ ($q$—$f'$—A, etc.), and parallel to the optical axis (A'—A), converging at a common point A defining the desired image plane A conjugate to the given image plane $a$. In similar manner, a point $b$ is projected along two ray paths, respectively $b$—$q$—$f'$—A—B and $b$—$f$—B'—B to convergence at B, determining the desired conjugate image plane B.

For more than a century, in this and derivative forms, this conventional graphic diagram has been constantly used for portraying the basic relationships between conjugate image points and planes.

I have discovered that, if the limiting frame aperture of a copying camera is moved rectilinearly of the optical axis relative to the lens, any point in its periphery will move along a locus line, such as $p$—$a$—$b$—$q$, parallel to the optical axis, and corresponding to the path of the ray $a$—$b$—$q$ which, after refraction, follows the straight line $q$—$f'$—A—B passing through the opposite focal point $f'$. From the conventional graphic diagram we also derive the fact that the other rays passing through the principal focal point $f$ from the respective image points $a$, $b$, etc., will also be refracted to converge at conjugate focal points A, B, etc., always in the straight line $q$—$f'$—A—B. This straight line is therefore the field locus of the given aperture point movement projected conjugately through the lens. For convenience I will call it the field locus line and designate it by 12 in the several figures.

According to my invention I may utilize one given point in the periphery of the limiting frame aperture, such as one corner thereof, and move the frame aperture rectilinearly of the optical axis, then project that point through the lens to conjugate focal points along the field locus line 12. In this situation I move the field area relative to the lens so that the conjugate field area corner is shifted along said line 12 as shown in Figure 1. Or conversely, as in Figure 2, the field area corner C is held fixed, the lens 11 moved along a lens locus line 13 parallel to the field locus line 12, and the given frame aperture corner moved relative to the lens 11 parallel to the optical axis to the suitable conjugate focal position. as shown in both Figures 1 and 2, the lens locus line 13 is parallel to the field locus line 12 and is spaced therefrom along the optical axis a distance equal to the focal length of the lens F.

From each position of the frame aperture corner $a$, $b$, etc., a cone of rays proceeds to the opening of the lens, is refracted, and then converges to its conjugate focal point C as shown in Figures 2 to 5 inclusive. For convenience, each such group of rays may be represented by the path of its axial ray passing through the nodal points of the lens, as $a$—N—N'—A, $b$—N—N'—B, etc., as in Figure 1. In each instance, the portions of such a path outside the lens are parallel, separated by the internodal distance N—N'. For purposes of simpler further illustration, however, this internodal distance will merely be assumed, and the projection of each frame aperture image point represented by a straight line through the center of the lens to its conjugate field area image point, as in Figures 2 to 5 inclusive.

The plane including the field area corner C and the optical axis of Figures 2 to 5 inclusive corresponds to the drawing plane of Figure 1. From the principal focal point $f'$ of the lens on the field side thereof and in this plane, the field locus line 12 extends downward over the field at that angle to the optical axis whose tangent equals the distance of the corner $a$ of the frame aperture from the optical axis divided by the focal length F of the lens. In this same plane, parallel to the field locus line 12 and above it by the distance F measured parallel to the optical axis, extends the lens locus line 13, so named because it is followed by the lens nodal point N'.

In Figure 3 I show a stand consisting of a tabular base member 14, and rigid therewith and extending upward therefrom a straight inclined guide beam 17 serving as support for a sliding bracket 18 holding the camera 19, and as a support for a sliding bracket 25 holding two spread apart abutment members shown here as straight blades 15 and 16. The lower surface of these blades establishes the field area plane, and they are so positioned that their inner edges extend from the field locus point C at right angles to each other and parallel to the respective side and end edges of the rectangular camera frame aperture 20, thus serving to define two adjacent edges of the field area 21. The field locus point C is a corner of the field area, is located in the field locus line 12, which as hereinbefore explained, passes through the principal focal point $f'$. In working operation, the two blades can be placed and used either separated from or contiguous to the upper surface of the tabular member 14, and in the latter case can even be attached to said tabular member.

The two blades 15 and 16 have scales thereon respectively graduated in scale unit divisions proportional to, but preferably equal to, the respectively parallel edges of the frame aperture 20, with the zero point of each scale at the field area corner C.

Along the support beam 17 slides the bracket 25 to which the blades 15 and 16 are attached in such relation that the field corner C is in the field locus line 12, so that movement of the bracket 25 along the support beam 17 causes the field area corner C to move upwardly or downwardly in relation to the lens, but always following the field locus line 12 precisely.

Along the support beam 17 also slides the bracket 18 to which the lens 11 is affixed in such relation that its nodal point N' is in the lens locus line 13, so that movement of the bracket 18 along the support beam 17 causes the nodal point N' to move upwardly or downwardly in relation to the field area plane 21, but always following the lens locus line 13 precisely.

The support beam 17 has shown thereon a graduated scale 22, the vertical unit divisions of which equal the focal length F of the lens measured parallel to the optical axis. The zero of this scale is preferably placed at the position of a marker 23 on the lens bracket 18 when the nodal point N' is above the upper surface of the tabular member 14 by exactly the distance F. The bracket 25 also has a marker 24 so positioned as to coincide with the zero of the scale 22 when the under surface of the blades 15 and 16 are in contact with the upper surface of the tabular member 14. The difference in the readings of marker 23 and marker 24 will then indicate the copying ratio for any given positions of the brackets 25 and 18, and thereby the proper settings of such brackets to secure desired copying ratios.

I have shown as my preferred construction in Figure 3 and the above description, the blade scales with unit divisions equal to the parallel dimensions of the frame aperture and the supporting beam scale with unit divisions equal to the focal length of the lens measured parallel to the optical axis. But any combination of such scales may be used, if their several unit divisions are maintained in correct operative correlation by being dimensioned in like relative proportions.

For any given relative position of brackets 18 and 25, the frame aperture 20 can be moved parallel to the optical axis upward or downward in relation to the lens 11 to a proper conjugate position to bring the frame aperture plane into suitable focus. When the frame aperture plane is so focused, the edges of the frame aperture will be projected through the lens to exact coincidence with the edges of the field area as defined by the inner abutting edges of the blades 15 and 16 and by the points on said blade scales corresponding to the copying ratio indicated by the difference in readings on scale 22 of the support beam 17 indicated by the bracket markers 23 and 24.

Figure 2 shows the lens bracket in two positions 18 and 18' on the support beam 17 in relation to the plane of the blades 15 and 16, the bracket being at positions 18 and 18' corresponding respectively to copying ratios 2 and 6. Corresponding field areas 21 and 21' are indicated at the inner edges of the blades 15 and 16 by the respective scale points 2 and 6 of their scales.

A correspondingly numbered scale may be used for setting the frame aperture plane at correct conjugate focal distance by hand, or mechanical means may be provided for doing the same automatically as bracket 18 and/or bracket 25 are moved along the support beam 17. In Figure 3 such illustrative means are shown as consisting of the bracket 25 slidably mounted on the support beam 17 and attached to the blades 15 and 16, a pulley 26 rotatably mounted under spring tension on bracket 18, which is slidably mounted on support beam 17, a cord attached at its lower end to bracket 25 and passing over and around pulley 26 to which its upper end is attached, a spiral cam 28 attached to rotate with pulley 26 and actuating the follower arm 29 of a lever pivoted on bracket 18, the other arm 30 of said lever engaging a movable member 31 of the camera chamber. When the bracket 18 is moved upward or the bracket 25 moved downward on the beam 17, the cord 27 is drawn off the pulley 26, causing it and the cam 28 to rotate so as to actuate the follower arm 29 of the lever upward and the opposite arm 30 downward, and with it the member 31 downward. When the bracket 18 is moved downward or the bracket 25 upward, the cord 27 is drawn back on the pulley 26 by spring tension, and the movements of members 28, 29, 30 and 31 are thereby reversed. Member 31 contains the frame aperture 20 and the several parts of this mechanism are so dimensioned that movement of either bracket along the support beam results in movements of the frame aperture plane to the focal distances from the nodal plane N conjugate to the respective distances of the field area plane from the nodal plane N'. Any other appropriate means for such coordinate maintaining of the frame and field planes in conjugate focus may be used, the one shown being merely illustrative.

It should be noted that focusing is effected, not by movement of the lens, but by movement of the frame aperture plane. More specifically, the nodal point N' of the lens follows accurately the straight lens locus line 13, i. e., its path must be parallel to the straight support beam 17. This can best be done by mounting the lens fixedly in relation to the bracket 18 which slides along the support beam 17, and then focusing by movement of the frame aperture member 31 relative to the lens and in a direction parallel to the optical axis of the lens.

This construction differs markedly from that of the ordinary camera in which the frame aperture is mounted in fixed relation to the support beam, the focusing being then effected by moving the lens in relation to the frame aperture plane. Even if such an ordinery camera were thus mounted on an inclined support beam with the frame aperature moving parallel thereto, the lens would depart from such straight parallel movement as it moved up and down in relation to the frame aperture. It would in fact move along a curved path instead of parallel to the straight field locus line, causing every point in the field area to shift in relation to the blade edges intended to define the field area. To correct for that shift, so as to use such field area abutting edges, would require an intricate compensating mechanism. All this is obviated by moving the lens in fixed parallel relation to the straight sloping support beam, and focusing by movement of the frame aperture instead of the lens.

In using my invention for copying purposes, the original to be copied is placed on the tabular member 14 with two edges of the area of said original to be copied in the corner C between and against the two blades 15 and 16. If the original has considerable thickness, as a book, the bracket 25 must be raised by upward movement and setting on the support beam 17 so that blades 15 and 16 rest upon the surface to be copied. If, however, the original is thin, as a sheet of paper, no such adjustive lifting of the bracket 25 and blades 15 and 16 need be done. In either case, the scale numbers at the two opposite edges of the field area are then read as defined by the corresponding edges of the area of the original to be covered, and the larger number used because it includes the lesser, such employed number being herein after referred to as the copying number. The bracket marker 23 is then set on the scale 22 so that it exceeds the reading of the marker 24 on said scale by said copying number. Meanwhile the automatic focusing mechanism brings the frame aperture into correct focal position conjugate to the focal distance between the lens and field area plane, causing the indicated field area to be conjugately projected precisely upon the frame aperture..

It will be apparent from the above that the means of my invention cause two adjacent edges of the field area to be fixated on the field plane, those two edges being hereinafter referred to as the fixated field edges. Those two edges are the conjugate projections through the lens of two corresponding frame aperture edges, which are hereinafter referred to as the fixated frame edges. Similarly the corner of the frame aperture at the intersection of the fixated frame edges is hereinafter referred to as the fixated frame corner, and the corner C of the field area at the intersection of the fixated field edges is hereinafter referred to as the fixated field corner.

In the practice of photographic copying, it is often desired to mask off portions of the frame aperture for various purposes. By thus reducing the effective photographic area within the frame, such masking also reduces correspondingly the projected effective copied area of the field. Also such reduction of the effective frame aperture and field area may be done along either one dimension or both.

Fractional Figure 4 corresponds to Figure 3 except that the frame aperture has been reduced, in this case in both dimensions, though such reduction can likewise be done in either dimension alone. Such reduction in the frame aperture should, however, be done along the edges opposite the fixated frame edges, and are shown so reduced at 32 and 33. By so reducing, the two fixated frame edges and the fixated frame corner are retained unaltered, so their conjugate projections through the lens will remain along the fixated field edges and fixated field corner C. This permits the use of the two blades 15 and 16 in the usual manner as abutment guides for the positive placing of the original to be copied.

But when either or both the dimensions of the effective frame aperture have been thus reduced, the corresponding scales of the blades 15 and/or 16 as shown in Figure 3 no longer serve their several purposes because their unit divisions are no longer equal to the respective frame aperture dimensions. Instead, in Figure 4 are shown blade scales 34 and 35, the unit divisions of which do equal those of the reduced frame aperture dimensions respectively. Such altered scales do measure properly the dimensions of the field area as actually covered, do thereby indicate the correct copying number for setting brackets 18 and 25, and do indicate the correct copying ratio required or used. In short, the masked frame aperture is merely treated as the effective frame aperture to which the field area guides and scales are properly correlated.

It is apparent that the blade scales 15 and 16 of Figure 3, and 34 and 35 of Figure 4, lie outside the edges of the field area being copied and therefore do not appear within the frame aperture nor on the copy as photographed through that aperture. But if, as in Figure 5, alongside one blade scale, an equal scale 36 be placed on the tabular surface just inside the blade edge when said surface and edge are brought together, it will lie within the field area and will appear within the frame aperture and be photographed on the copy, provided that the original be placed inset from the blade edge so as to leave this inner scale 36 uncovered. To make easier and surer the correct inset placing of the original, a stop 37 can be attached interior of the blade edge. Such stop should be removable or retractable when not in use. Also, though only one such inner scale is shown, together with only one such stop, such scales and stops can be placed interior of both blades.

This inner scale 36, with its unit divisions equal to the parallel dimensions of the frame aperture used, shows the exact copying ratio being employed, by the highest scale reading showing within the frame aperture and on the copy, and may therefore be described as a ratio scale. This has important uses. Thus a map or other drawing may be drawn to scale, but unless it has a comparative scale showing on the photographic copy, that drawing scale cannot be determined unless the copying ratio is known. My invention, by its precise recording of that copying ratio, provides the essential means for determining such map or other drawing scale from the copy itself.

The portion of the field area thus uncovered by the insert placing of the original can also be advantageously used for recording photographically other data insertable in this copied space. Thus a number or label for describing, identifying, classifying, indexing or filing may be inserted alongside the original. The number may be manually inserted or changed, or may be on an automatic counter coupled with the exposing by the camera. In this latter case, by indicating the number of exposures, the counter will also indicate how much film has been used, and conversely how much film remains unused. A convenient position for such an automatic counter, number or other data is shown at 38 in the corner C.

The advantages of my invention may be summarized as follows:

By reason of the two fixated field edges of the projected fixated frame edges, the original to be copied can be placed instantly and positively in correct position against two fixed guide abutments.

The copying ratio required to cover a given original or field area can be read instantly from the scales on the fixed guide abutments as copying number, permitting instant and positive setting of the camera.

The inset field scale and the stop for exact inset placing of the original permit photographic recording of the copying ratio employed, and thereby precise determination of the original scale from the copy.

The inset placing of the original also permits photographic recording of counter or other numbers, labels or other data, for purposes of reference, and for determination of film length used and unused.

The masking off of the frame aperture on the side and/or end opposite the fixated frame edges, combined with correspondingly reduced unit divisions of field scales, permits placing of the original against fixated abutment guides, determination of copying ratios and copying numbers for positive setting of the camera in the usual manner of my invention.

The effectiveness of my invention in these several ways arises basically from its precise fixation of two adjacent field edges. Without such precise fixation of these edges, the proper zeros of the field scales would shift positions with changes of copying ratio. In effect the scales themselves would shift relatively, so that scale readings would be incorrect. One result would be incorrect settings of the camera to cover indicated field areas. Also the copying ratio employed would be incorrectly indicated, so that the accurate determination of original scales of maps or other drawings would become impossible. Furthermore, the shifting of the field edges would cause relative shifting of the inset ratio scale, counter, numbers, labels or other data into and out of the effective photographic areas. My invention, by its basic and precise fixation of the two field edges, therefore makes all its secondary devices and uses practical and effective.

The foregoing description sets forth the invention in its preferred practical form, but the invention is to be understood as fully commensurate with the appended claims.

Having thus fully described the invention, what I claim as new and desire to secure by Letters Patent is:

1. In an assembly of the character described: an optical system comprising a camera having a lens and a frame provided with a limiting aperture and a conjugate field member, means for guiding the frame aperture for focusing movement relative to and axially of the lens, said lens and field member being relatively movable with respect to one another, and a straight supporting guide for directing movement of at least one of them parallel to a straight line drawn from the principal focal point of the lens on the field side thereof to a corner of the field image of the aperture when the planes of said aperture and field are in conjugate focus, in combination with abutment members arranged parallel to the edges of the frame aperture and having scales thereon, the zeros of which are at said corner of the field image, the camera and abutment members being both mounted for selective movement longitudinally of the straight supporting guide.

2. In an optical system comprising a camera having a lens and a frame member provided with a limiting aperture at one side of said lens, a field locating member at the other side of said lens, means for guiding the frame member aperture for focusing movement relative to and axially of the lens, with said field locating member and lens relatively movable with respect to one another, and a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus; the improvement which comprises: abutment members on said field locating member extending from said field image corner parallel to adjacent edges of the frame aperture and having scales thereon the zeros of which are at said field image corner.

3. An assembly according to claim 2, wherein the unit divisions of said scales are respectively proportional to the parallel dimensions of the frame aperture.

4. An assembly according to claim 2, wherein the unit divisions of said scales are respectively equal to the parallel dimensions of the frame aperture.

5. An assembly according to claim 2, wherein the supporting guide is also provided with a scale correlated with the scales on the abutment members.

6. An assembly according to claim 2, wherein at least one supplementary scale member is positioned in the field plane against an abutment of one of the abutment members, said supplementary scale member being provided thereon with a scale having graduations corresponding to those of the contiguous abutment member scale.

7. An assembly according to claim 2, wherein there is positioned within the field image area and contiguous to one of the abutment members reference data which it is desired to include within the copied area.

8. An assembly according to claim 2, wherein there are included operative connections between the camera and abutment members, said operative connections serving to maintain in conjugate focus the frame and field planes at all times irrespective of the spacing between them along the optical axis.

9. In an assembly according to claim 2, wherein the unit division of said scales are equal respectively to the parallel dimensions of the frame aperture and wherein said supporting guide is provided with a scale the unit divisions of which are equal to the focal length of the lens measured parallel to the optical axis of the lens.

References Cited in the file of this patent

UNITED STATES PATENTS

| 1,127,231 | Gregory | Feb. 2, 1915 |
| 2,428,627 | Kalman | Oct. 7, 1947 |
| 2,433,129 | Land | Dec. 23, 1947 |

FOREIGN PATENTS

| 668,689 | France | July 16, 1929 |
| 566,122 | Germany | Dec. 10, 1932 |
| 768,557 | France | May 22, 1934 |